United States Patent
Fasano

[11] Patent Number: 6,145,299
[45] Date of Patent: Nov. 14, 2000

[54] ROCKET ENGINE

[76] Inventor: Timothy Fasano, 225 Union La., Fallon, Nev. 89406

[21] Appl. No.: 09/196,499

[22] Filed: Nov. 19, 1998

[51] Int. Cl.[7] .................................................. B63H 11/00
[52] U.S. Cl. ............................... 60/204; 60/230; 60/232; 60/257; 60/258
[58] Field of Search .............................. 60/204, 230, 232, 60/257, 258; 239/269.19

[56] References Cited

U.S. PATENT DOCUMENTS 3,344,605  10/1967  Mageean et al. .......................... 60/258
3,358,453  12/1967  Swet ............................................ 60/225
3,699,772  10/1972  Elverum, Jr. ......................... 60/39.74 A Primary Examiner—Timothy S. Thorpe
Assistant Examiner—Ehud Gartenberg
Attorney, Agent, or Firm—Charles Hartman

[57] ABSTRACT

A liquid fuel rocket engine wherein the thrust producing exhaust of the engine is directed out of the engine in an annular fashion providing increased thrust and 360 degree thrust vectoring, while presenting the ability to be adaptable to different fuel/oxidizer mixtures, and prevent the sinusoidal shock wave formation typically associated with bell nozzle type rocket engines.

17 Claims, 3 Drawing Sheets

ROCKET ENGINE

BACKGROUND OF THE INVENTION

1. Field of the Invention

This invention relates to methods and apparatus of creating propulsion; in particular this invention relates to thrust producing apparatus; and most particularly, this invention relates to rocket engines.

2. State of the Art

Rocket engines of one sort or another have existed since the Chinese invented them some time in the twelfth century AD. These earliest rocket engines were solid fueled, that is they burned some solid propellant, for example, packed black powder, fast enough to provide enough thrust to lift the rocket off the ground and propel it into the air. The charge of fuel in these rockets was a solidly packed hollow cylinder of propellant, and the combustion gases exited through the hollow formed by the packed fuel at high velocity. Although these first rockets were little more than toys, the same fundamental principles that applied to these rockets apply to all rockets.

Another kind of rocket engine was invented earlier this century when Robert Goddard, among others, experimented with and perfected one kind of liquid fueled rocket engine—a kind which will be termed the bell nozzle engine herein. This term will cover all conical or bell shaped housings, whether or not they conform exactly to a bell nozzle geometry in detail or not. The Germans used the rockets propelled by the bell nozzle engine as a weapon of war—the V-2—during the Second World War to target London from across the English Channel. The engine used in the V-2 was entirely typical of liquid fueled rocket engines then and now. It included a hollow conical or bell shaped member, open at the large end, and having, at the narrow, closed end of the bell, a fuel and oxidizer entrance or fuel and oxidizer injectors. The fuel was burned with the oxidizer near the fuel and oxidizer entrance within the conical chamber—for example, in the case of the V-2, liquid ethanol was combusted with liquid oxygen(LOX)—and the hot, high pressure combustion gases formed exited the large open end of the cone to provide thrust that lifted the rocket propelled vehicle from the ground.

As noted, in general, these engines comprised hollow conical combustion chambers and nozzles disposed below fuel and oxidizer injectors. The injection apparatus into the conical combustion chamber can be quite simple; indeed, often a plate affixed to the narrow end of the conical chamber and interpenetrated with a plurality of apertures for the fuel and oxidizer to pass through suffices. In such simple rocket engines, the fuel is basically poured into the rocket combustion chamber through the apertures.

On the one hand, these bell nozzle style rocket engines have accomplished much; they have, for example, gotten humans to the moon and back. But, on the other hand, the engines used in the most modern rocket propelled vehicles—for example, the space shuttle—are little more than highly refined versions of the same old bell nozzle engine design that has been used for decades. And, as might be expected, this old, albeit simple and reliable, rocket engine design suffers from some inherent design limitations. Among them are, first, the velocity of the gases exiting the conical engine are influenced by the ambient pressure of the atmosphere they exit into. This requires one nozzle design for efficient high attitude and vacuum use and different design for the most effective low altitude use, that is primarily the time of lift off. This effectively precludes the use of a single design of bell nozzle style engine for a single stage that both takes off at near sea level and then acquires earth orbit. Second, the velocity of the gases exiting the nozzle, relative to the nozzle, is essentially a function of the Boltzmann average velocity distribution for molecules of the exhaust gas at the combustion temperature. The only effective method to increase the exit velocity of the gases in a bell nozzle style engine is to increase the temperature of combustion—and that temperature is, of course, dictated by the chemistry of the gases chosen for combustion.

A different kind of liquid fueled rocket engine has been developed over the last twenty five years, which will be termed the plug-nozzle engine hereinafter. This engine design evolved from experimental and analytical studies and the testing of various rocket nozzle configurations, combustion designs and improved, simplified engine cycles. The most obvious visual difference between the conventional bell and aerodynamic spike nozzle is that the bell design controls the primary flow of exhaust gases by the inner surface of a contoured restraining chamber wall, while in the aero-spike the primary flow is controlled by the atmospheric pressure acting in concert with an outer wall of the aero-spike to produce the thrust force. In many aero-spike engines, a secondary flow is introduced through the center of the annulus of the aerodynamic nozzle, increasing the base pressure and adding to the efficiency of the nozzle. A short, high performance rocket nozzle results.

The plug nozzle engine, combining the advanced nozzle and combustion chamber design, can result in a high-performance engine as much as 75 percent shorter than an equivalent bell nozzle engine. The advantages of such an engine include shorter, lighter inter-stage structures, plus a viable design choice between a shorter overall vehicle or significantly longer, larger capacity propellant tanks.

But plug nozzle engines suffer from some limitations. First, the flow out of a circular plug nozzle engine is largely symmetrical and not easily redirected. Linear plug nozzle engines, essentially circular engines that have been extended greatly along one axis, can be somewhat controlled relative to one dimension (as usually portrayed, a linear plug nozzle engine is oriented to enable adjustment of the pitch of the vehicle), but the linear plug nozzle propelled vehicles still require separate thrusters to enable yaw.

Another problem with conventional plug nozzles is that they create a region of subsonic flow just aft of the nozzle. As mentioned above, attempts to rectify this problem have been made that involve venting combusted gases from the center of the nozzle. Still this problem results in the formation of troublesome dynamic shock waves trailing the nozzle.

Therefore, it can be seen that the conventional bell and plug nozzles both present significant problems to those trying to develop the single stage to orbit concept.

SUMMARY OF THE INVENTION

This invention provides a liquid fuel rocket engine wherein the thrust producing exhaust of the engine is directed out of the engine in an annular fashion providing increased thrust and 360 degree thrust vectoring, while presenting the ability to be adaptable to different fuel/oxidizer mixtures, and prevent the sinusoidal shock wave formation typically associated with bell nozzle type rocket engines.

One aspect of this invention is a rocket engine comprising:
- a source of liquid fuel;
- a means for atomizing the liquid fuel in fluid communication with the source of liquid fuel;
- a chamber defined by a substantially enclosing chamber wall, the chamber disposed adjacent to the means for atomizing the liquid fuel in atomized fuel receiving relationship;
- a source of liquid oxidizer;
- a ring mounted on the substantially enclosing chamber wall defining a plurality of apertures, the plurality of apertures connected to the source of liquid oxidizer, the plurality of apertures substantially surrounding the chamber and disposed to admit the liquid oxidizer into the chamber;
- a housing having at least one substantially conical wall;
- a plurality of members attached to the housing in substantially radial array, and disposed within the chamber, and each of the plurality of members attached to the chamber walls holding the housing in fixed position with respect to the chamber;
- a conical surface disposed within the chamber, the surface forming substantially the top portion of the housing;
- a substantially annular passage defined by the wall of the housing and the substantially enclosing chamber wall, the combustion gasses passing through the annular passage, out to the ambient surroundings of the rocket.

Another aspect of this invention is a method comprising:
- atomizing liquid fuel;
- admitting the atomized fuel into a chamber defined by a substantially enclosing chamber wall;
- admitting an oxidizer from a ring mounted on the substantially enclosing chamber wall defining a plurality of apertures; combusting the fuel proximate a conical surface disposed within the chamber;
- and exhausting the combustion products through a substantially annular passage defined by the wall of the housing and the substantially enclosing chamber wall, the combustion gasses passing through the annular passage, out to the ambient surroundings of the rocket producing the thrust.

DETAILED DESCRIPTION OF THE PREFERRED EMBODIMENT

Figure 1:
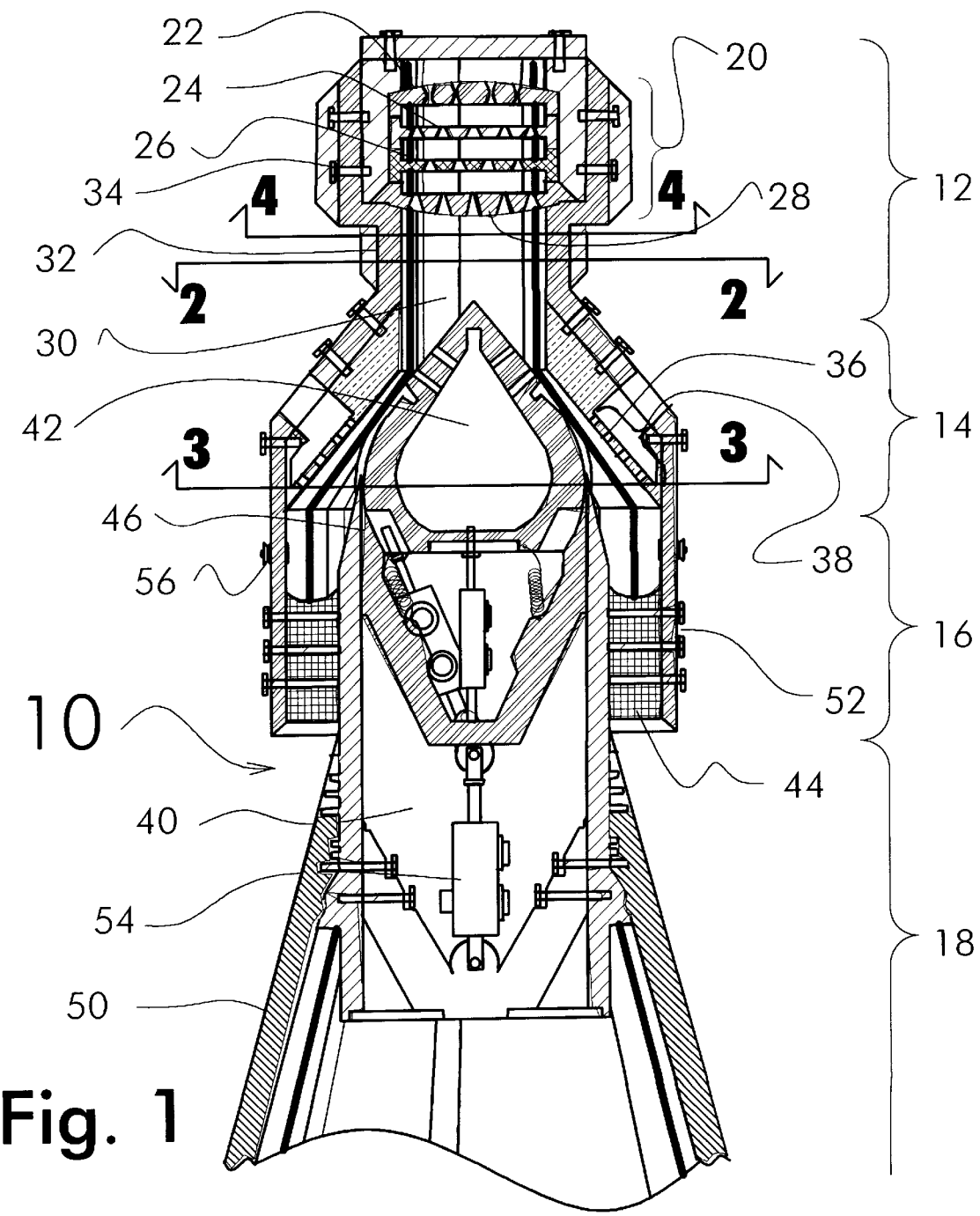
FIG. 1 shows a cutaway side view of a engine of the present invention, from the fuel injectors to the conical blast former, with the interior aero-spike shown in the forward position.

Referring now to FIG. 1, a rocket engine 10 has a fuel injection zone 12, an oxidizer injector zone 14, a combustion zone 16, and an exhaust zone 18.

The fuel injector zone 14 includes a means for atomizing 20 the fuel. One preferred method is a plurality of atomizer plates 22, 24, 26, 28 having orifices through which pressurized fuel passes. The source of fuel is tanks or the like, and in a rocket powered vehicle they will be carried in front of or above the engine mounting point.

The fuel is passed into a chamber 30 defined by a substantially enclosing chamber wall 31. The chamber is disposed adjacent to the means for atomizing the liquid fuel 20 in atomized fuel receiving relationship and the fuel passes into the chamber for contact with the oxidizer. The chamber and the atomizer plates are surrounded by stress bands or loop straps 32 and 34 to reinforce the chamber.

The vehicle also has an independent source of oxidizer. Usually this means a tank of oxidizer, LOX or the like, but it can mean a conduit to the atmosphere to allow atmospheric oxygen to be used by the engine. The oxidizer passes to a ring 36 mounted on the substantially enclosing chamber wall. The ring defines a plurality 38 of apertures through which the oxidizer passes into the chamber, which contains the atomized fuel. The plurality of apertures connected to the source of liquid oxidizer and substantially surround the entire chamber, and are disposed to admit the liquid oxidizer into the chamber around the entire chamber.

Disposed within the chamber is a housing 40 having a substantially conical member 42 on at least one end. The housing is attached to the chamber wall by a plurality of housing mounts 44 attached, on one end, to the housing in substantially radial array and attached, at the other end to the chamber wall. The members are disposed within the chamber, and each of the plurality of members acts in concert with the other members to hold the housing in fixed position with respect to the chamber. The housing ends in a conical surface disposed within the chamber, the surface forming substantially the top portion of the housing. In the preferred embodiment, the conical housing end is not merely an extension of the housing, but is positionable with respect to the rest of the housing.

The conical member 42 is movable with respect to the housing. The housing extension 46 embraces the conical member in a moveable relationship.

The chamber wall 31 is disposed away from the housing 40; the inner wall of the chamber 31 and the outer wall of the housing 40 defining a substantially annular passage 47. The oxidizer and the fuel combine and combust while passing into and through the annular chamber out from the annular opening 48 to the ambient surroundings of the rocket. This passage of the high pressure gasses provides the rocket with the thrust it requires to lift off and fly.

The conical flame guide 50 guides and focuses the thrust of the hot exhaust gases as they exit the engine. In operation the flame exiting the engine will be constrained on the first (outer) side by the atmosphere, and on the other side (inner) by the exterior of the flame guide.

It will be noticed that unlike, and, indeed, the opposite of, conventional plug nozzles, the shape of the cone is flared outwardly, that is, the diameter of the cone increases as it recedes from the combustion zone.

The housing is held onto the chamber by a plurality of housing mounts 44 that connect with the housing 40 and the outer wall 52. The central cone of the housing is adjustable. It is mounted on return springs and actuators 53 that allow the cone to be moved between zero and twenty degrees, preferably between zero and fifteen degrees and most preferably between 0 and ten degrees. There are actuators in at least two perpendicular planes that allow adjustment in all directions. Moreover, the conical member 42 is mounted on a vertical actuator 54 that can push the cone inwardly and withdraw it outwardly as the requirements of the engine demand.

The engine also has an ignition switch 56 that ignites the first portion of fuel and oxidizer to fire up the engine.

Figure 2:
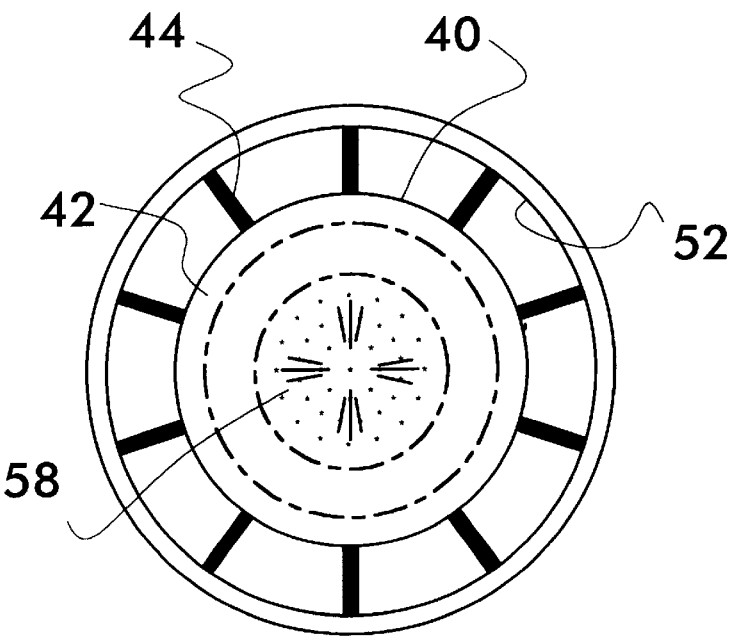
FIG. 2 shows a plan view of the cut along line 2—2 of FIG. 1 showing the top of the conical member and the mounting of the housing to form the annulus to the exterior of the rocket engine.

Referring now to FIG. 2, the central conical member 42 is mounted on the housing 40 which in turn is mounted on the walls 52 of the engine by housing mounts 44. It is preferred that there be more than five mounting points and less than twenty, preferably more than six and fewer than eighteen, and most preferably eight or more and fourteen or fewer. In the Fig. the viewer is looking at the top of the conical member and viewing out of the engine. The exhaust gage, the thrust providing gases, pass around the conical portion and between the housing mounts and out to the atmosphere.

To protect the conical portion from the heat of the combustion and to provide for a smoother burn inside the engine housing, the conical portion has a plurality of liquid oxygen portals 58. The portals are disposed around the top of the conical portion. The liquid oxygen that passes through these portals must be transported across the housing mounts 44 and pumped upwardly to the portals. The oxygen providing portion of the conical portion is defined by the inner oxygen ring 60.

Figure 3:
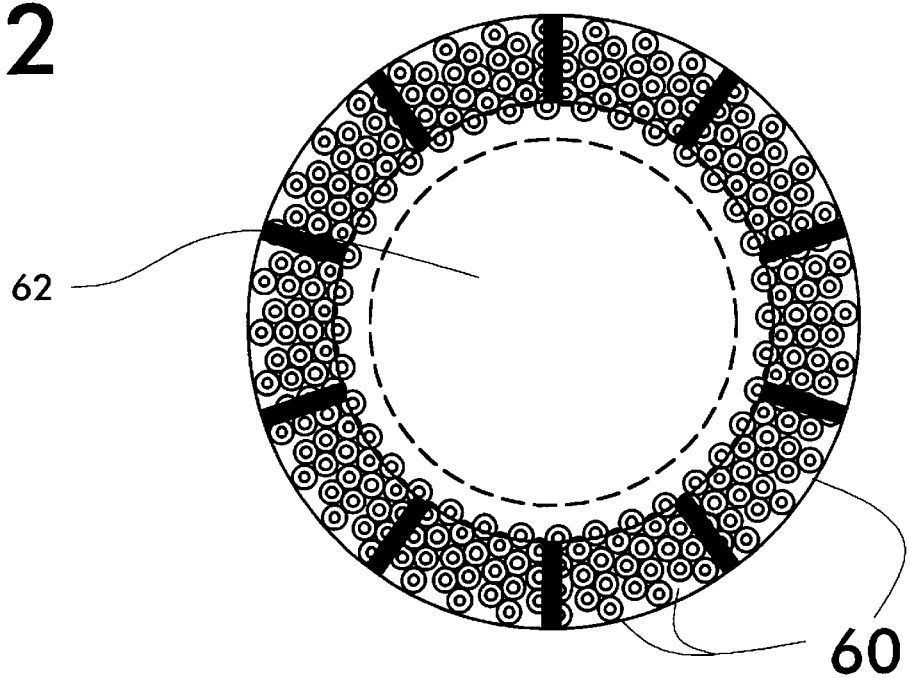
FIG. 3 shows a cutaway plan view of the oxygen inlets of the engine looking upwardly from line 3—3 of FIG. 1.

Referring now to FIG. 3, the main oxygen inlet, comprises a plurality of holes 60. Above the oxygen inlet is the fuel inlet 62. The fuel inlet allows the fuel to enter the chamber and to mix with the oxygen before passing to the combustion zone.

Figure 4:
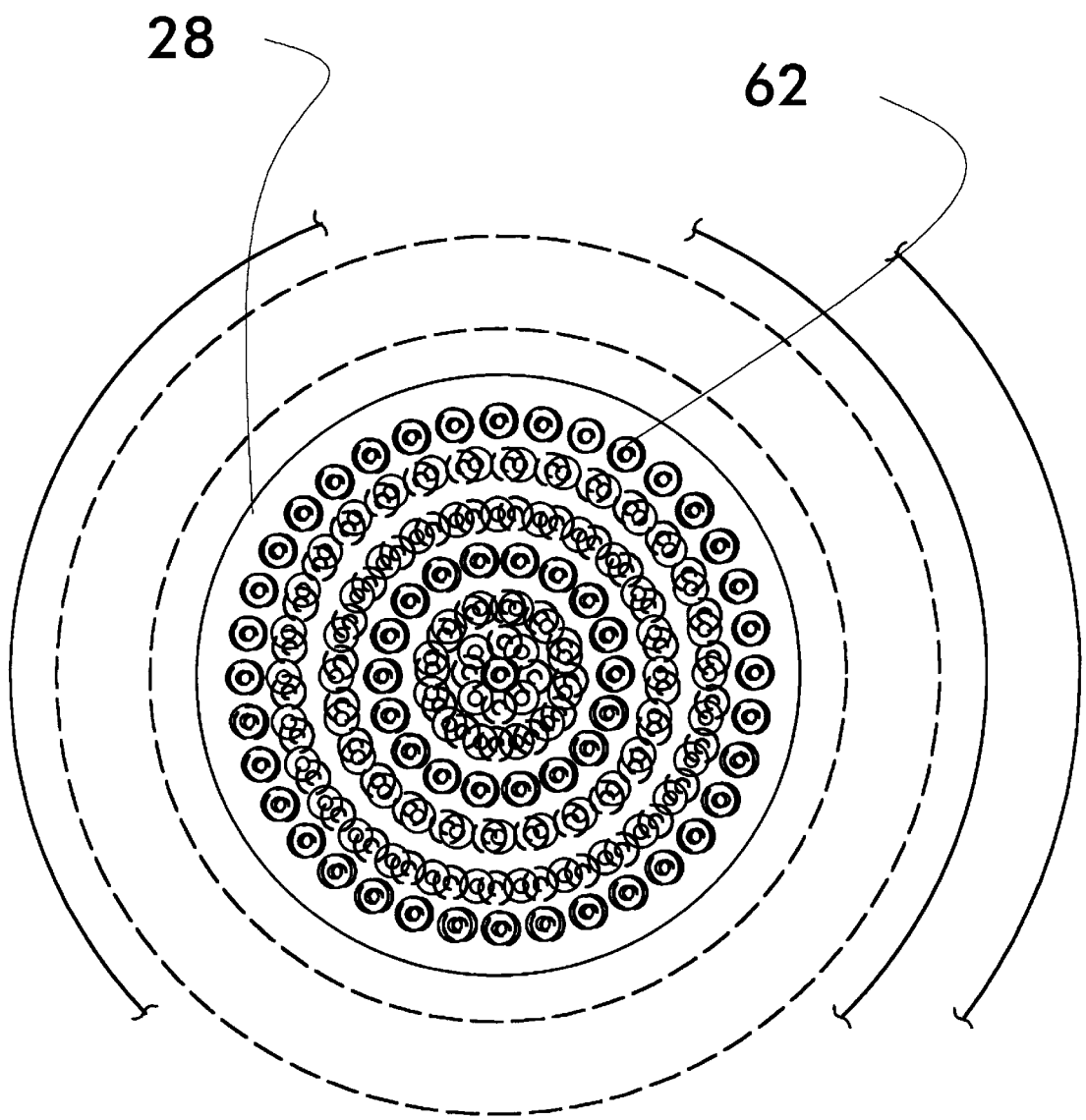
FIG. 4 shows a plan view looking up from the cut along line 4—4 in FIG. 1 showing the bottom of the bottom most of the fuel atomizer plates.

Referring now to FIG. 4, the fuel inlet plate 28, the last of the series of 4 atomizes the fuel passes through before entering the chamber and distributes the atomized fuel particles to the inner wall of the chamber for combustion. Five concentric rings of pluralities of apertures 62 on plate 28 are off set slightly from the apertures 62 on plate 28 can be moved along the axis of the housing.

The total area of the combined orifice diameters of the atomizer plates is proportional to the total inlet throat area. Any particular engine is designed with specific orifice diameters to allow the builder of the engine to restrict propellant flow to predetermined targets. The use accomplishes this by altering and, preferably, equally varying the individual diameters of the total number of orifices. Doing so allows one who knows the characteristics of the various fuels to optimize the atomization of any specific fuel at a given feed pressure of that fuel into the exit end of the chamber.

Additionally the total fuel inlet orifice area, and the orifice diameter restriction of the atomizer assembly defines and maintains, dictates the total $O_2$ injector ring orifice diameter. One may vary the diameters of the $O_2$ orifices and obtain the ability to alter the mixture ratio of oxidizer to propellant before firing the engine. This allows facile inter-flight replacement of the atomizer assembly or the oxidizer ring to allow the engine to use a variety of fuels, oxidizers and combinations of fuels and oxidizers. Of course, the mixture ratios of the fuel-to-oxidizer target mixture and oxidizer supply pressure also impact the calculations of the oxidizer diameters.

Referring again to FIG. 1, the conical portion is moveable backwardly by the actuators to allow the volume of the mixing zone to increase substantially. The actuators and their associated springs allow positioning and repositioning of the conical member both with respect to its orientation within and out of the chamber, but also to each side of the chamber, thereby allowing steerability of the engine in flight. The vertical orientation of the conical member is chosen to restrict the flow of the combustion gases there by increasing the exhaust velocity and thrust.

The conical portion is moved to allow the pressure inside the combustion zone to be as high as it possibly can be without exploding the engine. The exhaust will exit from the annular aperture and provide thrust. Added velocity in the axial direction is imparted to the exhaust by so restricting its flow, thereby forcing the same volume of exhaust through smaller orifice to increase the total velocity.

The position of the conical portion within the chamber is determined by the pressure desired. The conical portion increases velocity as the outlet aperture is constricted, up to the point where the flow is so constricted that the total thrust begins to decrease.

The fuel is stored in a tank or vessel mounted on the rocket mounting platform. The fuel is supplied from the tank to the atomizer means. It is preferred that the atomizer means be a series of perforated plates that force the fuel into finer and finer sprays with each pass through. Preferably the plates are cut with similar patterns that are disposed at between 25 and 60 degrees, preferably between 30 and 50 degrees and preferably between 35 and 45 degrees to each other. The atomized fuel will be defined herein to be fuel present in a liquid/vapor state where the liquid particles are less than 00.1 mm in mean diameter, preferably less than 0.001 mm in mean diameter, more preferably less than 0.0001 mm in mean diameter, and the liquid/vapor mix contains less than 50% unvaporized liquid.

The means to atomize the liquid fuel includes a series of plates, each perforated with a plurality of apertures. As shown, preferably each of the apertures 70 is of double countersunk configuration, that is both ends of the apertures are larger in diameter than the middle portion of the aperture. In cross section the apertures have an hour-glass configuration. Each of the plates has its apertures off set from the plate above and below it.

It will be appreciated from looking at the appended Figs., that the preferred shape of the combustion chamber is a substantially enclosed conically shaped chamber. Other shapes are not precluded, and given particular operational parameters, different shapes may be preferred. Similarly, the preferred shape of the chamber in radial dimension is a substantially enclosed cylindrically shaped chamber. Again, for particular parameters, particularly for an engine elongated along one radius to form essentially a flat or linear engine (similar to linear aero-spike engines) the chamber will be substantially deformed.

The oxygen injection ring is preferably mounted on chamber wall, and is preferably circular, although if the chamber is not circular, the ring may be of a shape to fit the chamber, wherein the ring mounted on the substantially enclosed chamber wall The shape of the conical surface of the conical member is not critical, but the member should have a point of between 30 and 60 degrees, preferably between 35 and 55 degrees, and most preferably between 40 and 50 degrees.

As mentioned, the conical surface will preferably be movable with respect to the radii of the conical surface. This moveablity allows the conical member to restrict the flow of exhaust on one side preferential to the flow on the other side. This, in turn, allows a great deal of directional deployment of the thrust vector, allowing in turn, control over the direction of the rocket powered vehicle. In another preferred embodiment, the conical member is movable axially. By this feature the thrust producing gases can be throttled within the engine as they are burning to produce extra velocity and therefore extra thrust.

The rocket engine of the present invention requires certain materials to be widely used. In particular, the surfaces of the conical member are exposed to extremely high temperatures and subject to melting and other phase transitions. Therefore, one of the preferred materials used in the surface of the conical member is monolithic alumina oxide coating; essentially, a sapphire coating is applied to the surface of the conical surface.

It should be noted that the fuel used in the present invention may be any conventional fuel, and may be hydrocarbon—preferred is RP-1—nitrogen hydride—ammonia, or hydrazine—alcohol, cryogenic hydrogen, and the like. Similarly, the oxidizer used may be any conventional oxidizer. Preferred are liquid oxygen, but nitrogen pentoxide, even fluorine or chlorine could be used. Clearly the preferred combination is liquid oxygen and liquid hydrogen.

Although the attitude adjusting means are not required for the engine to work, they are greatly preferred, since they are what give the rocket its desired degree of steerability. It is greatly preferred that the engine be equipped with the axial adjustment to allow control of the speed of the exiting exhaust; therefore, it allows control of the amount of thrust the engine produces.

It will be realized by those skilled in the art that there are many different kinds of atomizers that would work as substitution for the specific preferred embodiment. Among atomizers that are known to work, are valve atomizers and high pressure restriction orifices of alternative designs to that shown. The requirement of the atomizer is that it take a substantially bulk liquid fuel and vaporize it or mist it into fine droplets of no more than 0.1, preferably 0.01, and most preferably 0.001 mm in average diameter.

To exemplify a preferred embodiment of the present invention, the following tables show how varying the orifice diameter for both the atomizer and the $O_2$ injector ring assemblies produces the desired results for RP-1 or liquid hydrogen used with liquid oxygen. In particular, the calculated target orifice diameter for three assembly sized units show how varying propellant flows, oxidizer mixture ratios and total number of orifices affects the performance of the engine.

Table 1 shows different throat diameters and the different numbers and diameters of orifices that can be used and the results they achieve at a series of restriction diameters. The restriction denotes the amount of the atomizer plate that is absent due to the apertures. The three size throats used, 3.25, 6.5, and 13.0 inches respectively are used as illustrations that the present invention can be used in a variety of different sizes.

The three separate columns indicate a variance of internal throat dimensions of the propellant inlet.

Turning now to TABLE 1, three atomizer plate orifices assemblies are compared. Several restrictions are listed, and shown as TABLES 1A through TABLE 1E as targets for the purpose of establishing a variety of head pressure characteristics within the atomizer assembly. The percent of restriction refers to the total combined area of all orifices on a specific plate to allow for such a restriction of flow. Following this target flow area, is the total amount of orifices that may be integrated into a specific plate. Accordingly, the target diameter of each orifice is annotated with respect to the total target restriction and orifice count.

TABLE 1

| Assembly Size | 3.25 inch Throat | 6.5 inch Throat | 13.0 inch Throat |
|---|---|---|---|
| Flow Area | 8.2957 sq. in. | 33.183 sq. in. | 132.7321 sq.in. |
| Atomizer Plate Orifices | | | |

TABLE 1A

Restriction 50%

| | | | |
|---|---|---|---|
| Flow Area | 4.1478 sq. in. | 16.59 sq. in. | 66.3660 sq. in. |
| Individual Orifice Area | | | |
| 100 ea. | .0414 sq. in. | | |
| 125 ea. | .0332 sq in. | | |
| 275 ea. | | .0603 sq. in. | |
| 325 ea. | | .0510 sq. in. | |
| 800 ea. | | | .0829 sq. in. |
| 900 ea. | | | .0737 sq. in. |
| # Orifices | 100    125 | 275    325 | 800    900 |
| Orifice Dia. | .2295 in   .2055 in. | .2770 in.   .2548 in. | .3248   .3063 |

TABLE 1B

Restriction 40%

| | | | |
|---|---|---|---|
| Flow Area | 4.9774 sq. in. | 19.9098 sq. in. | 79.6392 sq. in. |
| Individual Orifice Area | | | |
| 100 ea. | .0497 sq. in. | | |
| 125 ea. | .0398 sq. in. | | |
| 275 ea. | | .0723 sq. in. | |
| 325 ea. | | .0613 sq. in. | |
| 800 ea. | | | .099 sq. in. |
| 900 ea. | | | .089 sq. in. |
| # Orifices | 100    125 | 275    325 | 800    900 |
| Orifice Dia. | .252 in.   .225 in. | .303 in.   .279 in. | .355 in.   .335 in. |

TABLE 1C

Restriction 30%

| | | | |
|---|---|---|---|
| Flow Area | 5.806 sq. in. | 23.228 sq. in. | 92.912 sq. in. |
| Individual Orifice Area | | | |
| 100 ea. | .058 sq. in. | | |
| 125 ea. | .046 sq. in. | | |
| 275 ea. | | .084 sq. in. | |
| 325 ea. | | .071 sq. in. | |
| 800 ea. | | | .116 sq. in. |
| 900 ea. | | | .103 sq. in. |
| # Orifices | 100    125 | 275    325 | 800    900 |
| Orifice Dia. | .272 in.   .242 in. | .327 in.   .301 in. | .384 in.   .362 in. |

TABLE 1D

Restriction 20%

| | | | |
|---|---|---|---|
| Flow Area | 6.636 sq. in. | 26.546 sq. in. | 106.186 sq. in. |
| Individual Orifice Area | | | |
| 100 ea. | .066 sq. in. | | |
| 125 ea. | .053 sq. in. | | |
| 275 ea. | | .097 sq. in. | |
| 325 ea. | | .082 sq. in. | |
| 800 ea. | | | .133 sq. in. |

TABLE 1D-continued

| Restriction 20% | | | | | | |
|---|---|---|---|---|---|---|
| 900 ea. | | | | | .118 sq. in. | |
| # Orifices | 100 | 125 | 275 | 325 | 800 | 900 |
| Orifice Dia. | .290 in. | .258 in. | .351 in | .323 in. | .379 in. | .388 in. |

TABLE 1E

| Restriction - 10% | | | | | | |
|---|---|---|---|---|---|---|
| Flow Area | 7.466 sq. in. | | 29.865 sq. in. | | 119.459 sq. in. | |
| Individual Orifice Area | | | | | | |
| 100 ea. | .074 sq. in. | | | | | |
| 125 ea. | .060 sq. in. | | | | | |
| 275 ea. | | | .109 sq. in. | | | |
| 325 ea. | | | .092 sq. in. | | | |
| 800 ea. | | | | | .149 sq. in. | |
| 900 ea. | | | | | .133 sq. in. | |
| # Orifices | 100 | 125 | 275 | 325 | 800 | 900 |
| Orifice Dia. | .307 in. | .276 in. | .376 in. | .342 in. | .436 in. | .412 in. |

Table 2 shows the results of using different numbers and diameters of oxygen orifices. In this example, the fuel is RP-1 and the oxidizer is liquid oxygen. The stoichiometric relationship between the two on a volumetric basis is between 2.1 and 2.75 to 1. Again the restriction refers to the amount of plate missing due to penetration by the apertures.

TABLES 2, 3, 4, and 5 shows different O2 injector ring assembly orifices. TABLES 2 and 3 show the assembly as would be used for RP-1 as the fuel source. TABLES 4 and 5 show similar data using Liquid Hydrogen as a fuel. TABLES 2 and 4 show the flow data and the restriction calculations, and TABLES 3 and 5 show the pressure data for the various configurations.

TABLE 2 shows the mixture percentage or flow ratio is the target mix ratio of oxidizer to fuel, as it applies to the target restricted flow of propellant through the atomizer assembly. Subsequently, the indicated flow area is the targeted total orifice area to achieve such a mixture ratio. Next is the indication of the count of orifices on the O2 Injector Ring Assembly with the individual orifice area and diameter immediately following.

TABLE 2

| O2 Injector Ring Assembly Orifices - RP-1\Liquid Oxygen Propellants - 2.1/2.75:1 | | | |
|---|---|---|---|
| 50% Flow Ratio of 50% Restricted Fuel Flow | | | |
| Flow Area | 2.074 sq. in. | 8.295 sq. in. | 33.183 sq. in. |
| # Orifices | 112 | 224 | 448 |
| Individual Orifice Area | .019 sq. in. | .037 sq. in. | .074 sq. in. |
| Orifice Dia. | .156 in | .217 in. | .307 in. |

TABLE 2B

| 55% Flow Ratio of 50% Restricted Fuel Flow | | | |
|---|---|---|---|
| Flow Area | 2.281 sq. in. | 9.124 sq. in. | 36.501 sq. in. |
| # Orifices | 112 | 224 | 448 |
| Individual Orifice Area | .020 sq. in. | .041 sq. in. | .081 sq. in. |
| Orifice Dia. | .160 in. | .228 in. | .321 in. |

TABLE 2C

| 60% Flow Ratio of 50% Restricted Fuel Flow | | | |
|---|---|---|---|
| Flow Area | 2.488 sq. in. | 9.954 sq. in. | 39.820 sq. in. |
| # Orifices | 112 | 224 | 448 |
| Individual Orifice Area | .022 sq. in. | .044 sq. in. | .088 sq. in. |
| Orifice Dia. | .167 in. | .240 in. | .335 in. |

TABLE 2D

| 50% Flow Ratio of 40% Restricted Fuel Flow | | | |
|---|---|---|---|
| Flow Area | 2.489 sq. in | 9.955 sq. in. | 39.820 sq. in. |
| # Orifices | 112 | 224 | 448 |
| Individual Orifice Area | .022 sq. in. | .044 sq. in. | .088 sq. in |
| Orifice Dia. | .167 in. | .240 in. | .335 in. |

TABLE 2E

| 55% Flow Ratio of 40% Restricted Fuel Flow | | | |
|---|---|---|---|
| Flow Area | 2.738 sq. in. | 10.950 sq. in. | 43.802 sq. in. |
| # Orifices | 112 | 224 | 448 |
| Individual Orifice Area | .024 sq. in. | .048 sq. in. | .098 sq. in. |
| Orifice Dia. | .175 in. | .247 in. | .353 in. |

TABLE 2F

| 60% Flow Ratio of 40% Restricted Fuel Flow | | | |
|---|---|---|---|
| Flow Area | 2.986 sq. in. | 11.946 sq. in. | 47.784 sq. in. |
| # Orifices | 112 | 224 | 448 |
| Individual Orifice Area | .027 sq. in. | .053 sq. in. | .106 sq. in. |
| Orifice Dia. | .185 in. | .260 in. | .367 in. |
| Flow Area | 2.903 sq. in. | 11.614 sq. in. | 46.456 sq. in. |
| # Orifices | 112 | 224 | 448 |
| Individual Orifice Area | .026 sq. in. | .052 sq. in. | .104 sq. in. |
| Orifice Dia. | .182 in. | .257 in. | .364 in. |

TABLE 2G

| 55% Flow Ratio of 30% Restricted Fuel Flow | | | |
|---|---|---|---|
| Flow Area | 3.193 sq. in. | 12.775 sq. in. | 51.102 sq. in. |
| # Orifices | 112 | 224 | 448 |
| Individual Orifice Area | .029 sq.in. | .057 sq. in. | .114 sq. in. |
| Orifice Dia. | .192 in. | .269 in. | .381 in. |

TABLE 2H

| 60% Flow Ratio of 30% Restricted Fuel Flow | | | |
|---|---|---|---|
| Flow Area | 3.484 sq. in. | 13.937 sq. in. | 55.747 sq. in. |
| # Orifices | 112 | 224 | 448 |
| Individual Orifice Area | .031 sq. in. | .062 sq. in. | .124 sq. in. |
| Orifice Dia. | .199 in. | .281 in. | .397 in. |

TABLE 2I

50% Flow Ratio of 20% Restricted Fuel Flow

| | | | |
|---|---|---|---|
| Flow Area | 3.318 sq. in. | 13.273 sq. in. | 53.093 sq. in. |
| # Orifices | 112 | 224 | 448 |
| Individual Orifice Area | .030 sq. in. | .059 sq. in. | .119 sq. in. |
| Orifice Dia. | .195 in. | .274 in. | .389 in. |

TABLE 2J

55% Flow Ratio of 20% Restricted Fuel Flow

| | | | |
|---|---|---|---|
| Flow Area | 3.650 sq. in. | 14.600 sq. in. | 58.402 sq. in. |
| # Orifices | 112 | 224 | 448 |
| Individual Orifice Area | .033 sq. in. | .065 sq. in. | .130 sq. in. |
| Orifice Dia. | .205 in. | .288 in. | .407 in. |

TABLE 2K

60% Flow Ratio of 20% Restricted Fuel Flow

| | | | |
|---|---|---|---|
| Flow Area | 3.982 sq. in. | 15.928 sq. in. | 63.712 sq. in. |
| # Orifices | 112 | 224 | 448 |
| Individual Orifice Area | .036 sq. in. | .071 sq. in. | .142 sq. in. |
| Orifice Dia. | .214 in. | .301 in. | .425 in. |

TABLE 2L

50% Flow Ratio of 10% Restricted Fuel Flow

| | | | |
|---|---|---|---|
| Flow Area | 3.733 sq. in. | 14.934 sq. in. | 59.730 sq. in. |
| # Orifices | 112 | 224 | 448 |
| Individual Orifice Area | .033 sq. in. | .066 sq. in. | .133 sq. in. |
| Orifice Dia. | .205 in. | .290 in | .412 in. |

TABLE 2M

55% Flow Ratio of 10% Restricted Fuel Flow

| | | | |
|---|---|---|---|
| Flow Area | 4.106 sq. in. | 16.426 sq. in. | 65.702 sq. in. |
| # Orifices | 112 | 224 | 448 |
| Individual Orifice Area | .037 sq. in. | .073 sq. in. | .147 sq. in. |
| Orifice Dia. | .217 in. | .305 in. | .433 in. |

TABLE 2N

60% Flow Ratio of 10% Restricted Fuel Flow

| | | | |
|---|---|---|---|
| Flow Area | 4.48 sq. in. | 17.919 sq. in. | 71.675 sq. in. |
| # Orifices | 112 | 224 | 448 |
| Individual Orifice Area | .040 sq. in. | .080 sq. in. | .160 sq. in. |
| Orifice Dia. | .226 in. | .320 in. | 451 in. |

Table 3 shows the pressures that are encountered when operating the rocket engine of the present invention.

TABLE 3

Fuel Inlet and Atomizer Operating Pressure

| | | |
|---|---|---|
| 475–600 PSIA, Nominal 540 PSIA | 950–1,200 PSIA, Nominal 1,075 PSIA | 1,900–2,400 PSIA, Nominal 2,150 PSIA |

Fuel Inlet and Atomizer Burst Pressure

| | | |
|---|---|---|
| 800 PSIA | 1,500 PSIA | 3,000 PSIA |

Mix and exit Chamber Operating Pressure

| | | |
|---|---|---|
| 200–300 PSIA, Nominal 230 PSIA | 400–600 PSIA, Nominal 470 PSIA | 800–1,200 PSIA, Nominal 910 PSIA |

Mix and Exit Chamber Burst Pressure

| | | |
|---|---|---|
| 500 PSIA | 1,000 PSIA | 2,000 PSIA |

Table 4 shows the results of using liquid hydrogen to liquid oxygen. This TABLE is read in the same manner as TABLE 2, except the oxidizer to propellant mixture. In this section, the ratio is reflected as the actual target mixture ratio rather than as a percentage.

TABLE 4

O2 Injector Ring Assembly Orifices - Liquid Hydrogen\Liquid Oxygen Propellants - 6.5/8.5:1

6.5:1 Flow Ratio of 50% Restricted Fuel Flow

| | | | |
|---|---|---|---|
| Flow Area | .638 sq. in. | 2.552 sq. in. | 10.210 sq. in. |
| # Orifices | 224 | 448 | 900 |
| Individual Orifice Area | .003 sq.in. | .0057 sq. in. | .0113 sq. in. |
| Orifice Dia. | .062 in | .085 in. | .120 in. |

TABLE 4B 7.5:1 Flow Ratio of 50% Restricted Fuel Flow

| | | | |
|---|---|---|---|
| Flow Area | .553 sq. in. | 2.552 sq. in. | 8.849 sq. in. |
| # Orifices | 224 | 448 | 900 |
| Individual Orifice Area | .0024 sq. in. | .0057 sq. in. | .0098 sq. in. |
| Orifice Dia. | .055 in. | .085 in. | .118 in. |

TABLE 4C 8.5:1 Flow Ratio of 50% Restricted Fuel Flow

| | | | |
|---|---|---|---|
| Flow Area | .488 sq. in. | 1.952 sq. in. | 7.808 sq. in. |
| # Orifices | 224 | 448 | |
| Individual Orifice Area | .002 sq. in. | .004 sq. in. | .0087 sq. in. |
| Orifice Dia. | .050 in. | .075 in. | .105 in. |

TABLE 4D 6.5:1 Flow Ratio of 40% Restricted Fuel Flow

| | | | |
|---|---|---|---|
| Flow Area | .767 sq. in | 3.063 sq. in. | 12.252 sq. in. |
| # Orifices | 224 | 448 | 900 |
| Individual Orifice Area | .0034 sq. in. | .0068 sq. in. | .0136 sq. in |
| Orifice Dia. | .066 in. | .093 in. | .132 in. |

TABLE 4E 7.5:1 Flow Ratio of 40% Restricted Fuel Flow

| | | | |
|---|---|---|---|
| Flow Area | .666 sq. in. | 2.655 sq. in. | 10.619 sq. in. |
| # Orifices | 224 | 448 | 900 |
| Individual Orifice Area | .0030 sq. in. | .0059 sq. in. | .0118 sq. in. |
| Orifice Dia. | .062 in. | .087 in. | .123 in. |

TABLE 4F 8.5:1 Flow Ratio of 40% Restricted Fuel Flow

| | | | |
|---|---|---|---|
| Flow Area | .586 sq. in. | 2.342 sq. in. | 9.369 sq. in. |
| # Orifices | 224 | 448 | 900 |
| Individual Orifice Area | .0026 sq. in. | .0052 sq. in. | .0104 sq. in. |
| Orifice Dia. | .058 in. | .081 in. | .115 in. |

TABLE 4G 6.5:1 Flow Ratio of 30% Restricted Fuel Flow

| | | | |
|---|---|---|---|
| Flow Area | .893 sq. in. | 3.574 sq. in. | 14.294 sq. in. |
| # Orifices | 224 | 448 | 900 |
| Individual Orifice Area | .004 sq. in. | .008 sq. in. | .0159 sq. in. |
| Orifice Dia. | .071 in. | .101 in. | .142 in. |

TABLE 4H 7.5:1 Flow Ratio of 30% Restricted Fuel Flow

| | | | |
|---|---|---|---|
| Flow Area | .774 sq. in. | 3.097 sq. in. | 12.388 sq. in. |
| # Orifices | 224 | 448 | 900 |
| Individual Orifice Area | .0034 sq.in. | .0069 sq. in. | .0138 sq. in. |
| Orifice Dia. | .066 in. | .094 in. | .133 in. |

TABLE 4J 8.5:1 Flow Ratio of 30% Restricted Fuel Flow

| | | | |
|---|---|---|---|
| Flow Area | .683 sq. in. | 2.733 sq. in. | 10.931 sq. in. |
| # Orifices | 224 | 448 | 900 |
| Individual Orifice Area | .003 sq. in. | .006 sq. in. | .0121 sq. in. |
| Orifice Dia. | .062 in. | .087 in. | .124 in. |

TABLE 4K 6.5:1 Flow Ratio of 20% Restricted Fuel Flow

| | | | |
|---|---|---|---|
| Flow Area | 1.021 sq. in. | 4.084 sq. in. | 16.336 sq. in. |
| # Orifices | 224 | 448 | 900 |
| Individual Orifice Area | .0046 sq. in. | .0091 sq. in. | .0182 sq. in. |
| Orifice Dia. | .077 in. | .108 in. | .152 in. |

TABLE 4L 7.5:1 Flow Ratio of 20% Restricted Fuel Flow

| | | | |
|---|---|---|---|
| Flow Area | .888 sq. in. | 3.539 sq. in. | 14.158 sq. in. |
| # Orifices | 224 | 448 | 900 |
| Individual Orifice Area | .0040 sq. in. | .0079 sq. in. | .0157 sq. in. |
| Orifice Dia. | .071 in. | .100 in. | .141 in. |

TABLE 4M 8.5:1 Flow Ratio of 20% Restricted Fuel Flow

| | | | |
|---|---|---|---|
| Flow Area | .781 sq. in. | 3.123 sq. in. | 12.492 sq. in. |
| # Orifices | 224 | 448 | 900 |
| Individual Orifice Area | .0035 sq. in. | .0070 sq. in. | .0139 sq. in. |
| Orifice Dia. | .067 in. | .094 in. | .133 in. |

TABLE 4N 6.5:1 Flow Ratio of 10% Restricted Fuel Flow

| | | | |
|---|---|---|---|
| Flow Area | 1.149 sq. in. | 4.595 sq. in. | 18.378 sq. in. |
| # Orifices | 224 | 448 | 900 |
| Individual Orifice Area | .0051 sq. in. | .0103 sq. in. | .0204 sq. in. |
| Orifice Dia. | .081 in. | .115 in. | .161 in. |

TABLE 4O 7.5:1 Flow Ratio of 10% Restricted Fuel Flow

| | | | |
|---|---|---|---|
| Flow Area | .995 sq. in. | 3.982 sq. in. | 15.928 sq. in. |
| # Orifices | 224 | 448 | 900 |
| Individual Orifice Area | .0044 sq. in. | .0089 sq. in. | .0177 sq. in. |
| Orifice Dia. | .075 in. | .106 in. | .150 in. |

TABLE 4P 8.5:1 Flow Ratio of 10% Restricted Fuel Flow

| | | | |
|---|---|---|---|
| Flow Area | .878 sq. in. | 3.514 sq. in. | 14.054 sq. in. |
| # Orifices | 224 | 448 | 900 |
| Individual Orifice Area | .0039 sq. in. | .0078 sq. in. | .0156 sq. in. |
| Orifice Dia. | .070 in. | .0997 in. | .141 in. |

TABLE 5

| | | |
|---|---|---|
| Fuel Inlet and Atomizer Operating Pressure | | |
| 1,500–1,800 PSIA, Nominal 1,700 PSIA | 3,100–3,600 PSIA, Nominal 3,350 PSIA | 6,300–7,100 PSIA, Nominal 6,700 PSIA |
| Fuel Inlet and Atomizer Burst Pressure | | |
| 1,950 PSIA | 3,900 PSIA | 7,700 PSIA |
| Mix and exit Chamber Operating Pressure | | |
| 575–825 PSIA, Nominal 750 PSIA | 1,150–1,650 PSIA, Nominal 1,400 PSIA | 2,300–3,300 PSIA, Nominal 2,800 PSIA |
| Mix and Exit Chamber Burst Pressure | | |
| 950 PSIA | 1,900 PSIA | 3,800 PSIA |

The inventor described this invention by reference to specific examples and embodiments thereof. One skilled in the art will find it possible to modify, alter, or otherwise change those examples and embodiments. In view of the foregoing, the scope of this invention defined by the appended claims fully encompass all such modifications, alterations, and changes.

I claim:

1. A rocket engine comprising:

a source of liquid fuel;

a means for atomizing the liquid fuel in fluid communication with the source of liquid fuel;

a chamber defined by a substantially enclosing chamber wall, the chamber disposed adjacent to the means for atomizing the liquid fuel in atomized fuel receiving relationship;

a source of liquid oxidizer;

a ring mounted on the substantially enclosing chamber wall defining a plurality of apertures, the plurality of apertures connected to the source of liquid oxidizer, the plurality of apertures substantially surrounding the chamber and disposed to admit the liquid oxidizer into the chamber;

a housing having at least one substantially conical wall;

a plurality of members attached to the housing in substantially radial array, and disposed within the chamber, and each of the plurality of members attached to the chamber walls holding the housing in fixed position with respect to the chamber;

a conical surface disposed within the chamber, the surface forming substantially the top portion of the housing;

a substantially annular passage defined by the wall of the housing and the substantially enclosing chamber wall, the combustion gasses passing through the annular passage, out to the ambient surroundings of the rocket.

2. The rocket engine of claim 1 wherein the means to atomize the liquid fuel includes a plurality of plates each having a plurality of atomization holes.

3. The rocket engine of claim 1 wherein the chamber is a substantially enclosed conically shaped chamber.

4. The rocket engine of claim 1 wherein the chamber is a substantially enclosed cylindrically shaped chamber.

5. The rocket engine of claim 1 wherein the ring mounted on the substantially enclosed chamber wall.

6. The rocket engine of claim 1 wherein the conical surface is shaped with an acute angle.

7. The rocket engine of claim 1 wherein the conical member is coated with a sapphire coating to protect it from heat.

8. The rocket engine of claim 1 wherein the conical surface is axially movable.

9. The rocket engine of claim I wherein the conical surface is radially movable.

10. The rocket engine of claim 1 wherein the conical surface is coated with an alumina oxide protectant.

11. The rocket engine of claim 1 wherein the fuel used is RP-1 and the oxidizer used is liquid oxygen.

12. A method of providing rocket thrust comprising:

atomizing liquid fuel;

admitting the atomized fuel into a chamber defined by a substantially enclosing chamber wall;

admitting an oxidizer from a ring mounted on the substantially enclosing chamber wall defining a plurality of apertures;

combusting the fuel proximate a housing conical surface disposed within the chamber;

and exhausting the combustion products through a substantially annular passage defined by the wall of the housing and the substantially enclosing chamber wall, the combustion gasses passing through the annular passage, out to the ambient surroundings of the rocket producing the thrust.

13. The method of claim 12 further including atomizing the fuel by passing it through a plurality of plates each having a plurality of atomization holes.

14. The method of claim 12 further including passing the atomized fuel into a substantially enclosed conically shaped chamber.

15. The method of claim 12 further including presenting the oxidizer into the chamber through a series of apertures defined in a ring mounted on the substantially enclosed chamber wall.

16. The method of claim 12 further including varying the thrust of the engine by moving an axially movable conical surface disposed within the chamber.

17. The method of claim 12 further including varying the direction of the thrust produced by the engine by radially moving a conical surface disposed within the chamber.

* * * * *